(12) United States Patent
Morris et al.

(10) Patent No.: US 11,826,606 B2
(45) Date of Patent: Nov. 28, 2023

(54) EXERCISE MAT HAVING A THREE-DIMENSIONAL SURFACE TEXTURE

(71) Applicant: LULULEMON ATHLETICA CANADA INC., Vancouver (CA)

(72) Inventors: Stephen Thomas Caulton Morris, Vancouver (CA); Colton Kai Yu, Vancouver (CA); Warren Christopher Howren Cheng, Vancouver (CA); Glenn Malcolm Boghosian, Santa Fe Springs, CA (US); Chen I. Kao, Dacun Township (TW)

(73) Assignee: LULULEMON ATHLETICA CANADA INC., Vancouver (CA)

( * ) Notice: Subject to any disclaimer, the term of this patent is extended or adjusted under 35 U.S.C. 154(b) by 287 days.

(21) Appl. No.: 17/077,392

(22) Filed: Oct. 22, 2020

(65) Prior Publication Data
US 2021/0121733 A1    Apr. 29, 2021

Related U.S. Application Data

(60) Provisional application No. 62/926,789, filed on Oct. 28, 2019.

(51) Int. Cl.
A63B 21/00     (2006.01)
B32B 27/40     (2006.01)
B29C 59/02     (2006.01)

(52) U.S. Cl.
CPC ........ *A63B 21/4037* (2015.10); *B29C 59/022* (2013.01); *B32B 27/40* (2013.01); *B32B 2262/0276* (2013.01); *B32B 2274/00* (2013.01); *B32B 2307/732* (2013.01); *B32B 2471/04* (2013.01)

(58) Field of Classification Search
CPC .................................................. A63B 21/4037
See application file for complete search history.

(56) References Cited

U.S. PATENT DOCUMENTS

| | | | |
|---|---|---|---|
| 8,220,087 B2 † | 7/2012 | Villa | |
| 9,902,125 B2 † | 2/2018 | Dandapure | |
| 11,007,402 B2 † | 5/2021 | Armitage | |
| 2012/0240336 A1 * | 9/2012 | Dandapure | ............. B32B 3/266 977/788 |
| 2016/0030799 A1 † | 2/2016 | Sutherland | |

\* cited by examiner
† cited by third party

*Primary Examiner* — Zachary M Davis
(74) *Attorney, Agent, or Firm* — McAndrews Held & Malloy, Ltd.

(57) ABSTRACT

Examples of an exercise mat having a three-dimensional surface texture and methods for making same are disclosed. The exercise mat may have a first malleable layer formed from a polyurethane material with an elastic fabric material attached to a lower surface thereof. A second layer may be attached to the elastic fabric material of the first layer. The second layer may be formed from a thermoplastic elastomer material and may have the three-dimensional surface texture formed on an upper surface thereof to which the first layer conforms. The exercise mat may also include a third rubber layer attached to the second layer.

7 Claims, 9 Drawing Sheets

EXERCISE MAT HAVING A THREE-DIMENSIONAL SURFACE TEXTURE

This application claims priority from and the benefit of the filing date of U.S. Provisional Patent Application No. 62/926,789, filed Oct. 28, 2019, and the entire content of such application is incorporated herein by reference.

TECHNICAL FIELD

This application relates to the field of mats, and more specifically, to exercise mats and the like.

BACKGROUND

Consumers are demanding improved mats for yoga and other activities. One problem with existing mats is that they often provide inadequate support for a user's body. Another problem is that the upper surface or face of existing mats is often slippery. A further problem with existing mats is that they are often heavy and hard to roll-up or otherwise transport especially thicker mats that do provide adequate support.

SUMMARY OF THE APPLICATION

In one aspect, an exercise mat having a three-dimensional surface texture is provided. The exercise mat may have a first malleable layer formed from a polyurethane material with an elastic fabric material attached to a lower surface thereof. A second layer may be attached to the elastic fabric material of the first layer. The second layer may be formed from a thermoplastic elastomer material and may have the three-dimensional surface texture formed on an upper surface thereof to which the first layer conforms. The exercise mat may also include a third rubber layer attached to the second layer. In another aspect, methods for making an exercise mat having a three-dimension surface texture are provided.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the application. Sizes and relative positions of elements in the drawings are not necessarily drawn to scale. For example, the shapes of various elements and angles may be not drawn to scale, and some of these elements may be arbitrarily enlarged and positioned to improve drawing legibility.

DETAILED DESCRIPTION

In the following description, details are set forth to provide an understanding of the application. In some instances, certain structures, techniques, and methods have not been described or shown in detail in order not to obscure the application.

Figure 1:
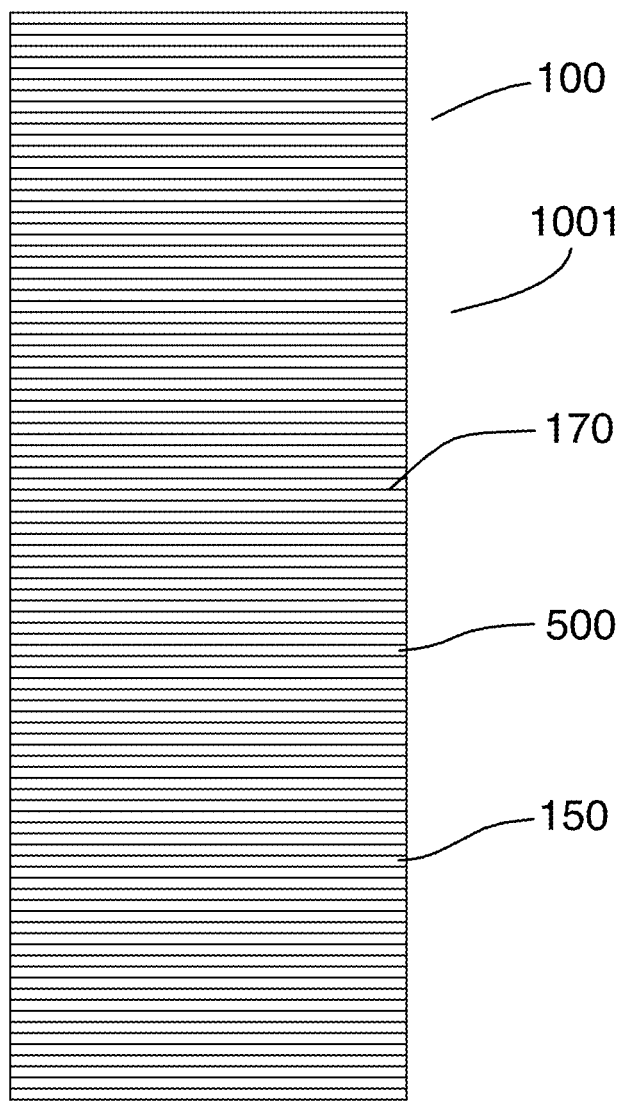
FIG. 1 is a top view illustrating an example exercise mat having a three-dimensional surface texture, the exercise mat shown in a flat or rolled-out position.
Figure 2:
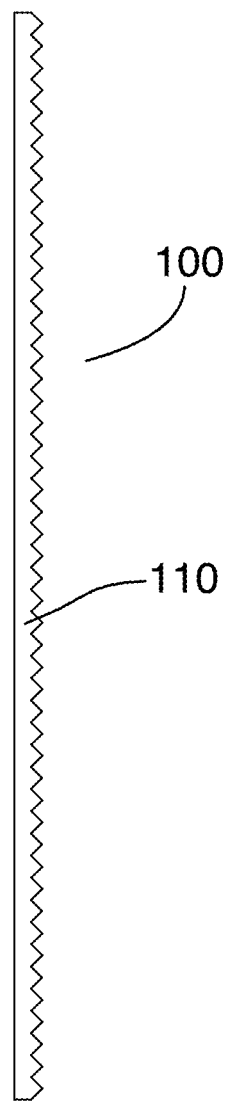
FIG. 2 is a left side view thereof, the right side view being a mirror image thereof.
Figure 3:
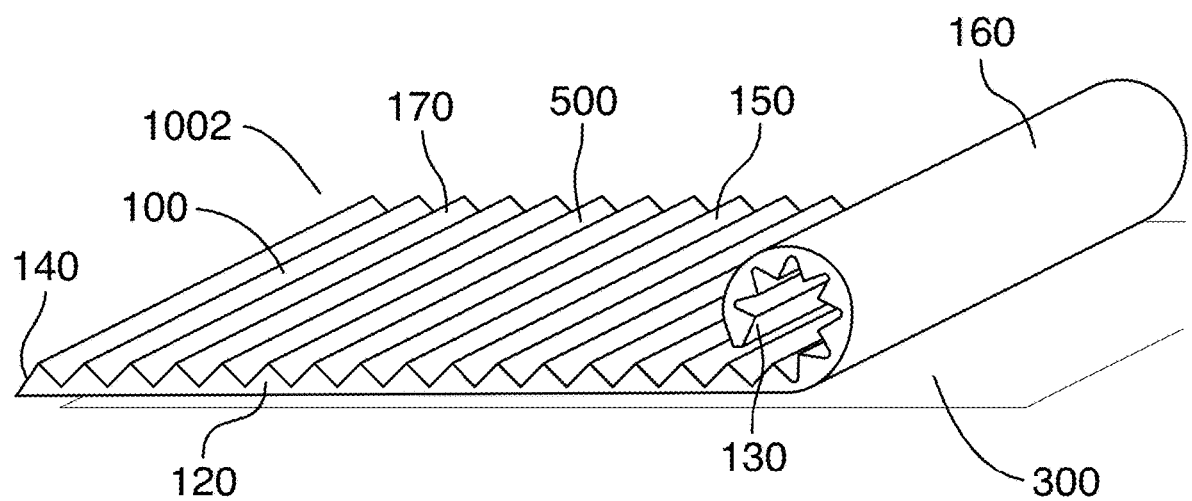
FIG. 3 is a perspective view thereof, the exercise mat shown in a partially rolled-up position.
Figure 4:
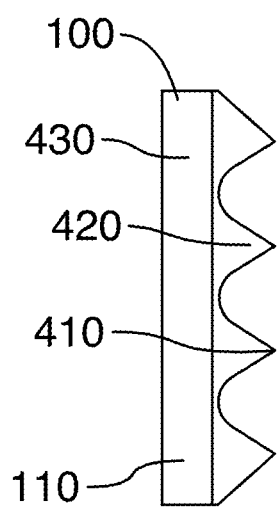
FIG. 4 is a left side detail view illustrating a portion of the left side of the exercise mat of FIG. 1.
Figure 5:
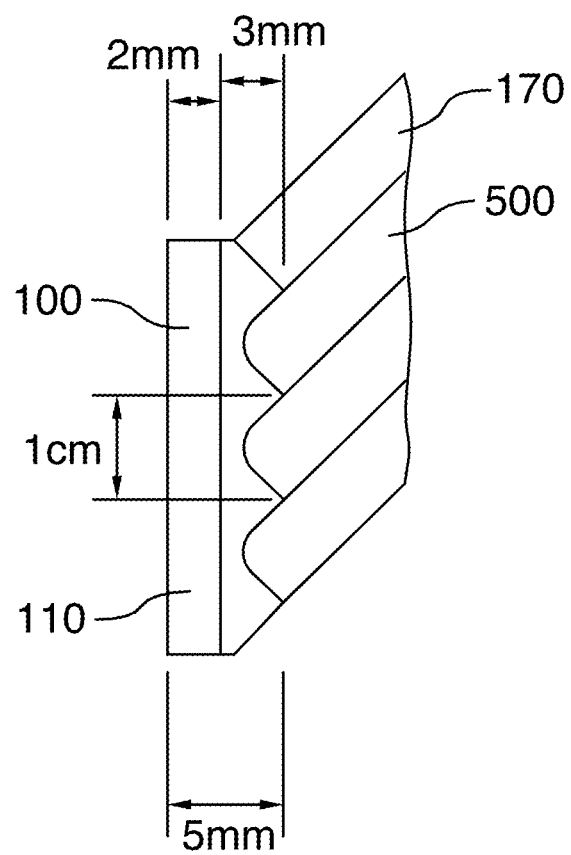
FIG. 5 is perspective view thereof.
Figure 6:
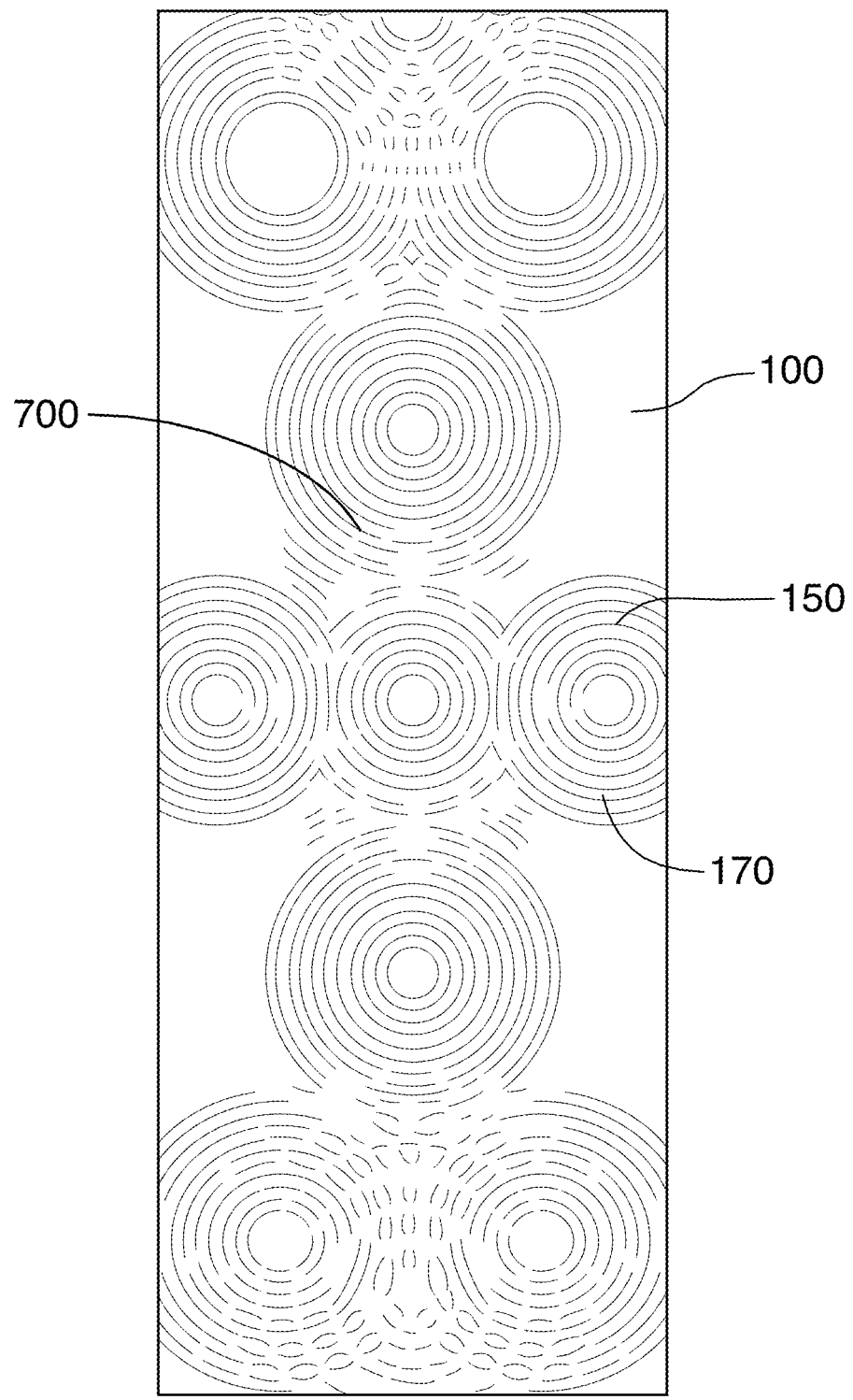
FIG. 6 is a top view illustrating an example exercise mat having another three-dimensional surface texture, the exercise mat shown in a flat or rolled-out position.
Figure 7:
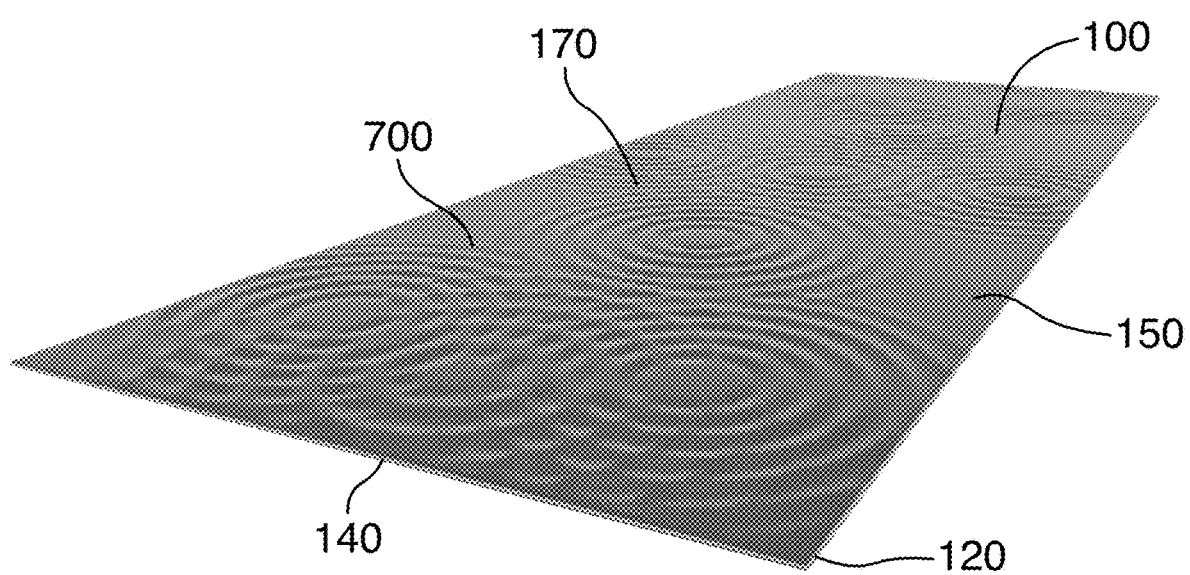
FIG. 7 is a perspective view thereof.
Figure 8:
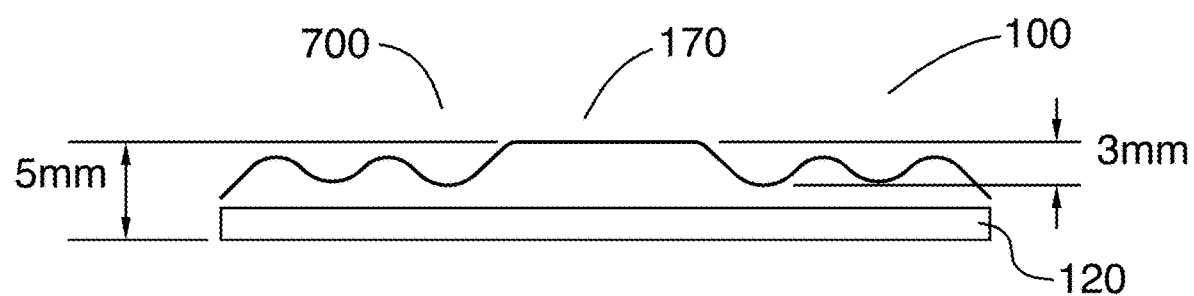
FIG. 8 is a right side detail view illustrating a portion of the right side of the exercise mat of FIG. 6.
Figure 9:
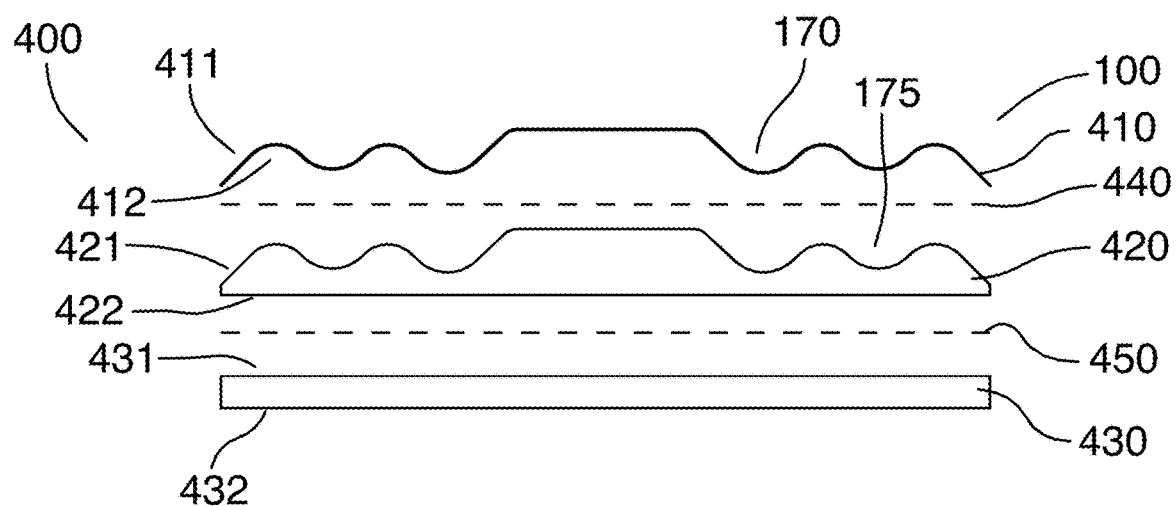
FIG. 9 is an exploded view thereof.
Figure 10:
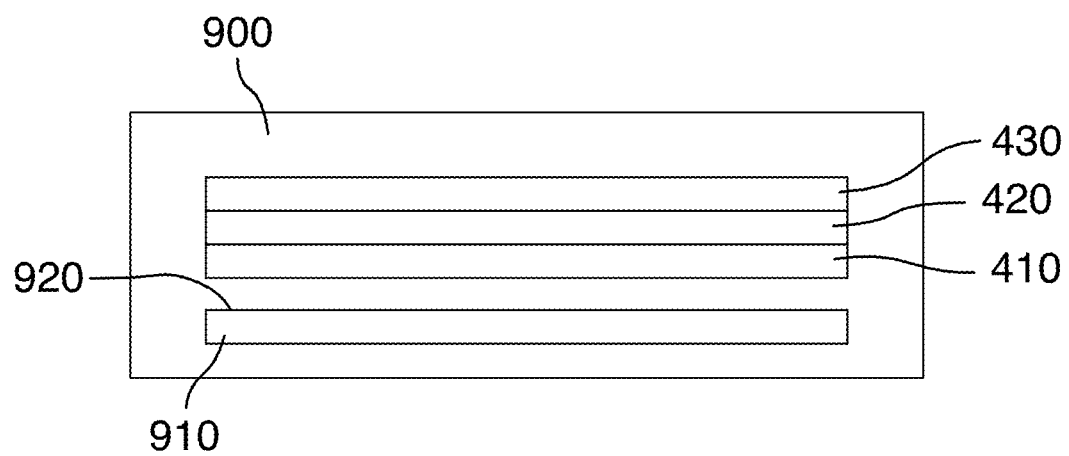
FIG. 10 is a block diagram illustrating an example vacuum embossing machine.
Figure 11:
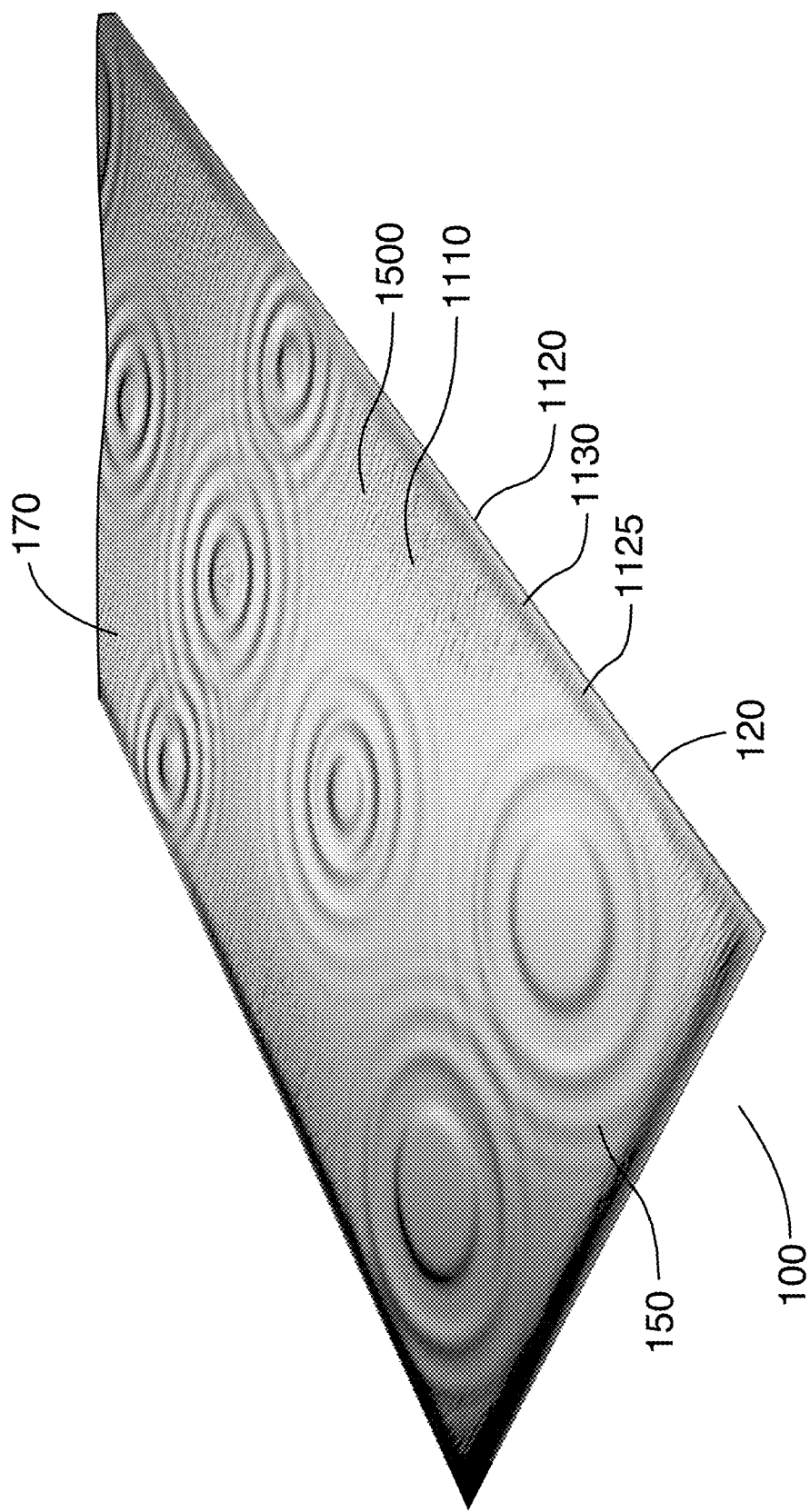
FIG. 11 is a perspective view illustrating an example exercise mat having contoured edges.
Figure 12:
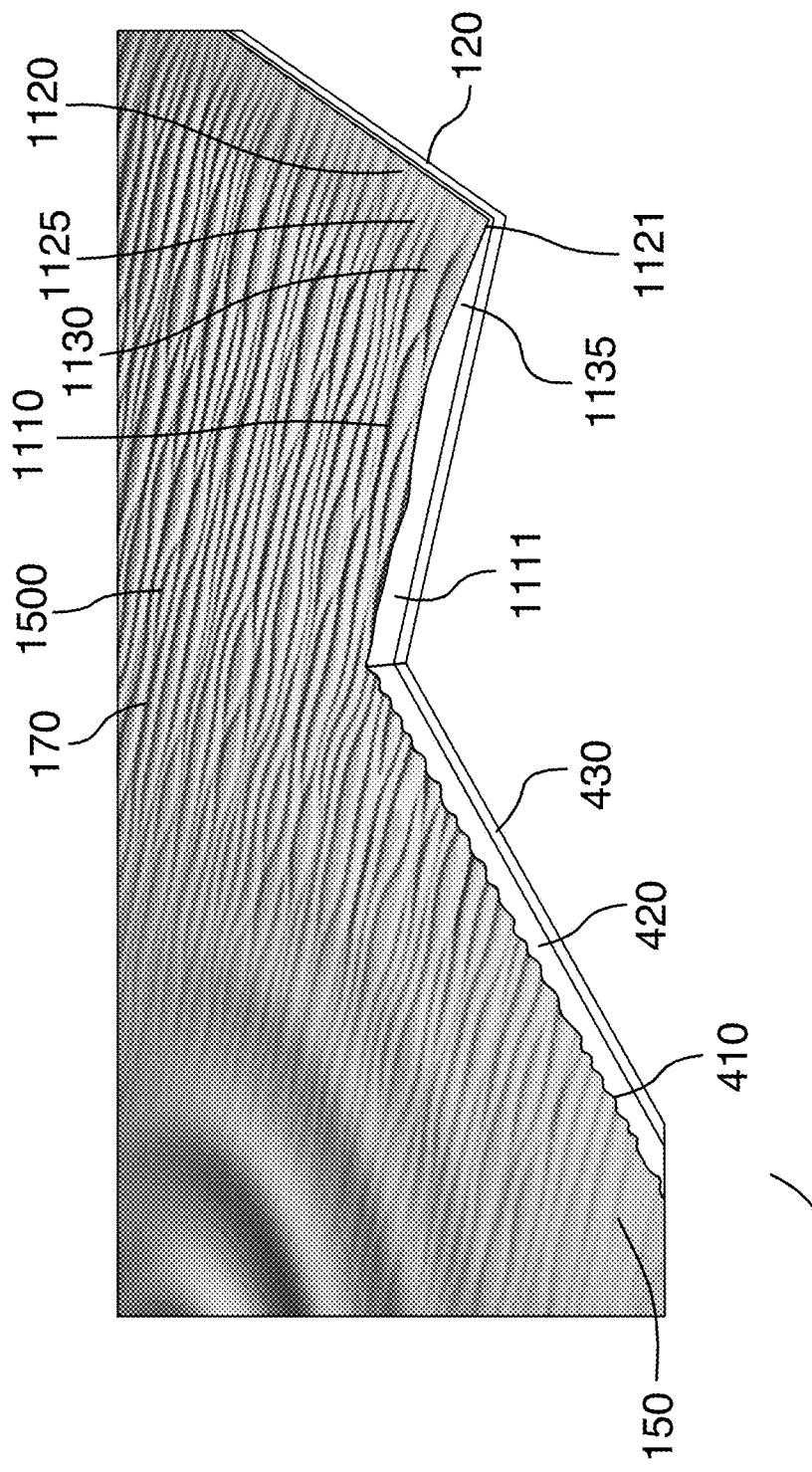
FIG. 12 is a cross-sectional perspective detail view thereof.

FIG. 1 is a top view illustrating an example exercise mat 100 having a three-dimensional surface texture 170, 500, the exercise mat 100 shown in a flat or rolled-out position 1001. FIG. 2 is a left side view thereof, the right side view being a mirror image thereof. FIG. 3 is a perspective view thereof, the exercise mat 100 shown in a partially rolled-up position 1002. FIG. 4 is a left side detail view illustrating a portion of the left side 110 of the exercise mat 100 of FIG. 1. FIG. 5 is perspective view thereof. FIG. 6 is a top view illustrating an example exercise mat 100 having another three-dimensional surface texture 170, 700, the exercise mat 100 shown in a flat or rolled-out position 1001. FIG. 7 is a perspective view thereof. FIG. 8 is a right side detail view illustrating a portion of the right side 120 of the exercise mat 100 of FIG. 6. FIG. 9 is an exploded view thereof. FIG. 10 is a block diagram illustrating an example vacuum embossing machine 900. FIG. 11 is a perspective view illustrating an example exercise 100 mat having contoured edges 1125. And, FIG. 12 is a cross-sectional perspective detail view thereof.

FIGS. 1 to 9, 11, and 12 illustrate an exercise mat 100 according to embodiments of the application. The exercise mat 100 may be placed on a flat surface or floor 300 by a user to provide cushioning, grip, support, or stability, or any combination thereof, allowing the user to more easily and effectively perform yoga or other exercises. The exercise mat 100 may be used in the flat, unrolled, or rolled-out position 1001 and may be transported in the rolled or rolled-up position 1002. The exercise mat 100 may comprise several layers 400 of varying materials and structures disposed atop one another as will be further described below.

FIGS. 1 and 6 are top views of the example exercise mat 100. According to one embodiment, the exercise mat 100 is rectangular in shape and has a first or left side 110, a second or right side 120, a third or upper side 130, a fourth or lower side 140, a top surface 150, and a bottom surface 160. These views show a rectangular exercise mat 100 of sufficient size to support a typical user's body through a wide range of yoga positions. Example sizes may include, but are not limited to, a width of 66 cm or approximately 66 cm and a length of 180 cm or approximately 180 cm. FIGS. 5 and 8 are side views of the exercise mat 100. As illustrated in FIGS. 5 and 8, the thickness of the exercise mat 100 can be significantly less than its length and width. Example thicknesses may include, but are not limited to, a thickness of 5 mm or approximately 5 mm. Note that all of the dimensions provided herein are for illustration purposes only and persons skilled in the art would understand that the mat 100 may be longer/wider/thicker or shorter/narrower/thinner than the example dimensions provided without departing from the scope of the application. Although a rectangular exercise mat 100 is shown in FIGS. 1 to 9, 11, and 12, it will be understood to one skilled in the art that the exercise mat 100 may be differently shaped, such as being a square, triangle, circle, or oval, or any other shape or design.

The exercise mat 100 has a three-dimensional texture 170 embossed, molded, or formed in the top surface 150. In FIGS. 1-5, the three-dimensional texture 170 has a horizontal ridged pattern 500 that may extend, for example, from 0 to 2.5 mm or approximately 0 to 2.5 mm below the top surface 150. In FIGS. 6-8, the three-dimensional texture 170 has a water drop wave pattern 700 that may extend, for example, from 0 to 3 mm or approximately 0 to 3 mm below the top surface 150. In FIGS. 11-12, the three-dimensional texture 170 further includes a tidal flow wave pattern 1500 that may extend, for example, from 0 to 2 mm or approximately 0 to 2 mm below the top surface 150. Although ridged, water drop wave, and tidal flow wave patterns 500, 700, 1500 are shown in FIGS. 1 to 9, 11, and 12, it will be understood by one skilled in the art that the three-dimensional texture 170 of the top surface 150 of the exercise mat 100 may have any other pattern, shape, or design. The three-dimensional texture 170 can provide tactile feedback enabling a user to determine their position, such as the location and/or direction of the user with respect to the exercise mat 100. In addition, the three-dimensional texture 170 can enhance the support (e.g., grip and/or slip) properties of the exercise mat 100. According to one embodiment, the exercise mat 100 may have three layers 410, 420, 430. The three layers 410, 420, 430 are separated in FIG. 9 to illustrate their arrangement. It should be noted that although three layers 410, 420, 430 are shown and described herein, in some embodiments, only one or two of the layers 400 may be used. In addition, in some embodiments, additional layers 400 may be added to the first, second, or third layers 410, 420, 430 that are shown and described.

According to one embodiment, the top or first layer 410 is a malleable layer having an upper surface 411 and a lower surface 412. The first layer 410 is formed from a polyurethane ("PU") material. An elastic fabric material 440 may be attached to the PU material over the lower surface 412 of the first layer 410. According to one embodiment, the elastic fabric material 440 may be a four-way stretch nylon material. Note that the upper surface 411 of the first layer 410 corresponds to the top surface 150 of the exercise mat 100.

The first layer 410 may be formed of a material that absorbs or wicks away moisture, keeping the first layer 410 dry during exercise. The first layer 410 may provide a level of friction that gives sufficient grip (e.g., in wet and/or dry conditions) to a user without restricting the user's movement. The first layer 410 may also be made of a suitable material which can help the exercise mat 100 hold its shape, provide cushioning, provide flexibility, or provide support, or any combination thereof; or a material that bonds well with other exercise mat layers 400; or any combination thereof.

According to one embodiment, the middle or second layer 420 has an upper surface 421 and a lower surface 422. The upper surface 421 of the second layer 420 is attached to the elastic fabric material 440 on the lower surface 412 of the first layer 410. The second layer 420 is formed from a thermoplastic elastomer ("TPE") material. The upper surface 421 of the second layer 420 has a three-dimensional texture 175 molded, embossed, or formed thereon. As the first layer 410 is a malleable layer, it conforms to the three-dimensional texture 175 of the upper surface 421 of the second layer 410 and hence the three-dimensional texture 175 of the second layer 420 defines the three-dimensional texture 170 of the top surface 150 of the exercise mat 100.

The second layer 420 may provide structural integrity and cushioning for the exercise mat 100. The second layer 420 may be made of a suitable material which can help the exercise mat 100 hold its shape, provide cushioning, provide flexibility, or provide support, or any combination thereof; or a material that bonds well with other exercise mat layers 400; or any combination thereof. In addition, the three-dimensional texture 170 can provide tactile feedback allowing a user to determine their position, such as the location and/or direction of the user on the exercise mat 100.

According to one embodiment, the bottom or third layer 430 has an upper surface 431 and a lower surface 432. The upper surface 431 of the third layer 430 is attached to the lower surface 422 of the second layer 420. The third layer 430 is formed from a rubber material. According to one embodiment, the exercise mat 100 may further include a polyester cotton cloth material 450 sandwiched between the second and the third layers 420, 430. Note that the lower surface 432 of the third layer 410 corresponds to the bottom surface 160 of the exercise mat 100.

The third layer 430 may provide friction and/or traction (e.g., in wet and/or dry conditions), so that when it is placed in contact with the floor 300 by a user, the exercise mat 100 does not slide when the user uses the exercise mat 100 (e.g., for yoga or another exercise). The third layer 430 may also provide cushioning for a user of the exercise mat 100. In some embodiments, the third layer 430 may be provided with a textured surface to enhance grip. In some embodiments, the third layer 430 may also be made of a suitable material which can help the exercise mat 100 hold its shape, provide cushioning, provide flexibility, provide wear and tear resistance, or provide support, or any combination thereof; or a material that bonds well with other exercise mat layers 400; or any combination thereof. The third layer 430 may also be perforated (e.g., with punched holes) to allow moisture to pass through and for quick drying of the exercise mat 100. It should be noted that any of the layers 400 described herein may also be perforated.

According to one embodiment, as illustrated in FIGS. 5 and 8, the thickness of the exercise mat 100 may be 5 mm or approximately 5 mm. The third layer 430 may be 2 mm or approximately 2 mm thick and the first and second layers 410, 420 may be 3 mm or approximately 3 mm thick at the highest point of the three-dimensional texture pattern 170. Of course, the exercise mat 100 and its various layers 400 may have other thicknesses as well to achieve different flexibility or cushioning requirements for the exercise mat 100.

Advantageously, use of the three-dimensional texture pattern 170 reduces the weight of the exercise mat 100, reduces the size (i.e., outside diameter) of the exercise mat 100 when in the rolled-up position 1002, improves the grip and moisture management properties of the exercise mat 100, improves the tactile sensation/feedback and stability of the exercise mat 100, and maintains the same level of cushioning or approximately the same level of cushioning as prior exercise mats not having three-dimensional texture patterns.

The various layers 400 described above may be attached to one another using any suitable technique or method. In one embodiment, the layers may have thermoplastic bonding properties that cause adjacent layers to bond with one another when heated. Alternatively, the layers 400 may be bonded using adhesives and/or mechanical connections. In addition, any combination of these methods or any other method may be used.

According to one embodiment, the exercise mat 100 may be made using a vacuum embossing machine 900 such as that shown in FIG. 10. The vacuum embossing machine 900 may include a mold plate 910 having an embossed top surface 920. The embossed top surface 920 may have a female version of the three-dimensional surface texture embossed thereon to form a male version of the three-dimension surface texture 170 on the final exercise mat 100. An example method for making an exercise mat 100 having a three-dimensional surface texture 170 using the vacuum embossing machine 900 may include the following steps.

First, a first layer 410 of the exercise mat 100 is prepared by pouring liquid polyurethane onto an elastic fabric 440 and curing the polyurethane. Second, a second layer 420 that comprises a thermoplastic elastomer is attached to a fabric side 412 of the first layer 410. Third, a mat made from the first and second layers 410, 420 is cut to a desired size and shape. Fourth, the mat is positioned on a mold plate 910 having an embossed top surface 920 with a polyurethane side 411 of the first layer 410 facing the embossed top surface 920, the embossed top surface 920 being embossed with a predetermined three-dimensional surface texture.

Fifth, the mold plate 910 is inserted into a vacuum embossing machine 900 and the mat is heated, for example, for two minutes or approximately two minutes at a temperature of 170 degrees Celsius or approximately 170 degrees Celsius. Alternatively, the mat 100 may be heated, for example, for 1 to 15 minutes at a temperature of 120 to 200 degrees Celsius and with a certain or predetermined suction pressure provided by the embossing machine 900. Sixth, the mat is cooled for 5 minutes or approximately 5 minutes to produce the final exercise mat 100. In the above method, the temperature and suction provided by the vacuum embossing machine 900 softens the thermoplastic elastomer of the second layer 420 conforming it to the predetermined three-dimensional surface texture of the embossed top surface 920 of the mold plate 910 and forms a corresponding predetermined three-dimensional surface texture 170 through the polyurethane side 411 of the first layer 410. The method may further include attaching a third layer 430 that comprises a rubber material to the second layer 420.

As illustrated in FIGS. 11 and 12, the exercise mat 100 has a central portion 1110 and one or more edge portions (e.g., 1130) extending from the central portion 1100 to respective edges (e.g., 1120) of the exercise mat 100. The edges (e.g., 1120) may be proximate the sides (e.g., 120) of the exercise mat 100. According to one embodiment, at least one edge portion 1130 of the exercise mat 100 may be beveled, chamfered, or otherwise contoured 1135 to form a contoured edge portion or contoured edge 1125. For example, the thickness of the exercise mat 100 may gradually reduce 1135 from a greater thickness 1111 in the central portion 1110 of the exercise mat 100 across the edge portion 1130 to a lesser thickness 1121 at the edge 1120 of the exercise mat 100 to form the contoured edge 1125. As another example, the thickness of the second layer 420 of the exercise mat 100 may gradually reduce 1135 from a greater thickness 1111 in the central portion 1110 of the exercise mat 100 across the edge portion 1130 to a lesser thickness 1121 at the edge 1120 of the exercise mat 100 to form the contoured edge 1125. The second layer 420 may be eliminated or reduced to zero thickness at or proximate the edge 1120. As a further example, the second layer 420 may reduce in thickness 1130 from 3 mm or approximately 3 mm in the central portion 1110 of the exercise mat 100 to 1 mm or approximately 1 mm at the edge 1120 of the exercise mat 100 to form the contoured edge 1125. Advantageously, the contoured edges 1125 reduce the possibility of a user or other person tripping over the mat 100 when in use. In addition, the contoured edges 1125 increase the sense of flow between the exercise mat 100 and the surrounding environment or floor 300.

While particular elements, embodiments and applications of the present application have been shown and described, it will be understood, that the scope of the application is not limited thereto, since modifications can be made by those skilled in the art without departing from the scope of the present application, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this application. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the application.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

What is claimed is:

1. An exercise mat having a three-dimensional surface texture, comprising:
    a first malleable layer formed from a polyurethane material and having an elastic fabric material attached to a lower surface thereof; and,
    a second layer attached to the elastic fabric material of the first layer, the second layer formed from a thermoplastic elastomer material and having the three-dimensional surface texture formed on an upper surface thereof, the upper surface having the three-dimensional surface texture formed thereon facing and secured to the elastic fabric material of the first layer, wherein the first layer conforms to the three-dimensional surface texture of the second layer to thereby provide the three-dimensional surface texture on an upper surface of the first layer;
    wherein the three-dimensional surface texture is formed by vacuum embossing conforming to a three-dimensional surface texture formed on a mold plate.

2. The exercise mat of claim 1, further comprising a third layer attached to a lower surface of the second layer, the third layer formed from a rubber material.

3. The exercise mat of claim 2, further comprising a polyester cotton cloth material sandwiched between the second and the third layers.

4. The exercise mat of claim 1, wherein the elastic fabric material is a four-way stretch nylon material.

5. The exercise mat of claim 1, wherein at least one edge portion of the exercise mat is contoured, beveled, or chamfered and wherein a thickness of the at least one edge portion gradually reduces from a greater thickness at a portion of the edge portion away from an edge of the exercise mat to a lesser thickness at the edge of the exercise mat.

6. The exercise mat of claim 1, wherein the three-dimensional surface texture is one or more of a ridged pattern, a water drop wave pattern, and a tidal flow wave pattern.

7. The exercise mat of claim 6, wherein the exercise mat has a thickness of 5 mm and the three-dimensional surface texture extends from 0 to 3 mm below a top surface of the exercise mat.

* * * * *